United States Patent [19]

Hall

[11] Patent Number: 4,457,600
[45] Date of Patent: Jul. 3, 1984

[54] LIGHT PROJECTION SYSTEMS

[76] Inventor: Joseph F. Hall, 26098 Getty Dr., Laguna Niguel, Calif. 92677

[21] Appl. No.: 310,528

[22] Filed: Oct. 13, 1981

[51] Int. Cl.$^3$ ............................................. G03B 21/00
[52] U.S. Cl. ...................................... 353/122; 353/98; 353/85
[58] Field of Search ............... 362/335, 346, 338, 308; 353/85, 98, 99, 38, 122, 102, 76–78, 121, 69, 70; 350/443

[56] References Cited

U.S. PATENT DOCUMENTS

| Re. 17,038 | 7/1928 | Ballman et al. | 353/98 |
|---|---|---|---|
| 2,186,123 | 1/1940 | Rantsch et al. | 353/38 |
| 2,309,788 | 2/1943 | Ramberg | 353/98 |
| 2,476,898 | 7/1949 | Nicoll | 353/98 |
| 3,296,923 | 1/1967 | Miles | 353/38 |
| 3,922,085 | 11/1975 | Sheets | 353/98 X |
| 4,061,420 | 12/1977 | Kaprelian et al. | 350/443 X |

FOREIGN PATENT DOCUMENTS

| 158706 | 5/1940 | Austria | 350/443 |
|---|---|---|---|
| 370991 | 3/1923 | Fed. Rep. of Germany | 353/99 |
| 551674 | 1/1923 | France | 353/99 |
| Ad.52228 | 6/1943 | France | 353/38 |
| 1362180 | 11/1964 | France | 353/99 |

Primary Examiner—Harry N. Haroian
Attorney, Agent, or Firm—Grover A. Frater

[57] ABSTRACT

A light directing system includes a reflector whose shape in the direction from pole to open end varies from parabolic to elliptical with successively nearer remote foci. The output of the reflector is focused to a common focal point in a lens whose magnification varies from negative to positive in the radial direction from central to outer regions of the lens. The marginal part of the output beam is added to the central part of the beam in a mirror system. The resultant beam is then divided and recombined in an amorphics integrating lens system and then transferred to a film gate and projection lens set.

7 Claims, 6 Drawing Figures

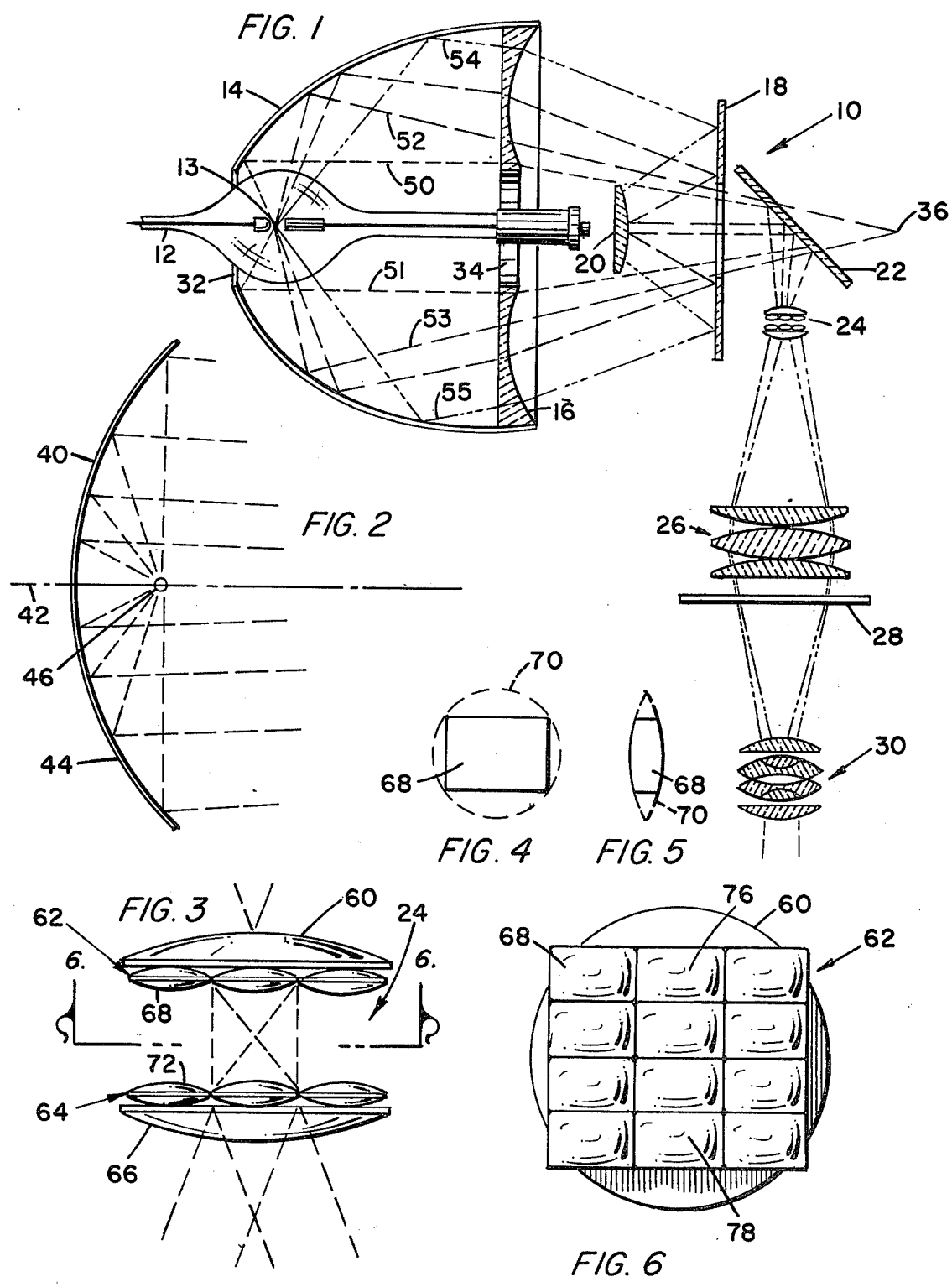

LIGHT PROJECTION SYSTEMS

TECHNICAL FIELD

This invention relates to light projection systems for use in lamp houses and the like.

BACKGROUND ART

Light projection systems are used in spotlights, picture projection systems, and other applications. Some major objectives in the design of such systems are the need to minimize heating and to dissipate what heat is generated. Another major objective in many cases is to reduce the physical size of the system. In some applications there is a need to achieve uniform distribution of light over the area being illuminated and, in most applications, there is a need to provide for safe replacement of lamps.

The systems that are made possible by this invention are concerned with lamp replacement safety to the extent that they are compatible with and can incorporate the safe lamp handling system and apparatus. The systems of the invention are directly concerned with, and they achieve, efficiency, heat control, packaging size, and illumination uniformity.

Illumination uniformity is particularly important in motion picture projection, especially in creating special effects during picture production. It is difficult to illuminate the marginal portions of a picture to the level of central region illumination. When the final scene includes projection of a photographed background, the degree of non-uniformity is multiplied. Some scenes in the motion picture Star Wars were photographs of photographs of photographs —more than two dozen times. Non-uniformity is multiplied two dozen times. That severely limits the film maker's ability to make special effects look real, and it forces him to concentrate story telling and mood setting at picture center.

Even after the film has been produced, the effectiveness with which it can be displayed on large, wide screens depends heavily on the effectiveness of the light system to illuminate the margins of the projector's film gate.

Practical light sources are omnidirectional and generate infra-red as well as visible rays. Those factors combine, when high light intensity output is required in one direction, to make it necessary to use reflectors. When it is desired that output light rays be directed along parallel output paths, a parabolic reflector is used. On the other hand, if the output light rays are to converge to a focal point, an elliptical relfector is used. For reflection of a given fraction of the available light, the parabolic reflector has the largest diameter. The elliptical reflector has smaller diameter and the diameter is decreased as the distance to the focal point is decreased. In the prior art, reduction in reflector diameter is achieved by shortening the distance to the focal point, which complicates lens design if an image of the light source is to be projected uniformly, or by reducing diameter and losing the light that would be reflected from the outer margins of the reflector In practice, both of these expedients are employed in a compromise between output intensity, lens system complication, and uniformity of intensity across the output beam.

Except in arrangements that produce a central shadow, the light output from a reflector is always more intense at the central region of the output beam. Unless intensity is modified in some fashion, images of the source seen after reflection are less intense away from the center. The effect of that can be made less apparent to a viewer by increasing source light intensity, but to do that multiplies the heat dissipation problem. Increasing source intensity cannot overcome the effect of non-uniform intensity when projecting the composite of multiple projections.

DISCLOSURE OF THE INVENTION

The invention provides a light directing system which, for a given size, is capable of projecting a larger proportion of the output from an omnidirectional source toward a given focal point than prior systems. Moreover, it can provide greater uniformity of light intensity across the width of the output beam. To provide that result is an object of the invention.

Another object is to provide that result in an arrangement which minimizes heating, because of its efficiency, and which facilitates separation of the infra-red components from the visible components of the source light.

To achieve those objects, the invention combines a special reflector shape with a special lens. A preferred version of the invention combines the light from the margins of the reflector with the light from the center of the reflector and directs it, if desired, toward a common focal point. That is done with an annular mirror to receive light from the margins of the reflector and direct that light to another mirror which is positioned on the axis of the reflector in the shadow of the lamp structure.

If it is desired to separate out the infra-red portion of the light, a "cold" mirror is placed to redirect the visible part of the light that passes through the annular mirror while allowing infra-red radiation to continue to heat collection and removal means. To aid in such heat removal, the annular mirror is also a cold mirror in the preferred form that incorporates heat removal.

When even greater uniformity of light distribution is required, the light output from the system thus far described, or from a substitute system, is directed through a novel integrating lens system. This integrating lens system is formed by the combination of a collimating lens, two sets of shaped lenses and a focusing lens. Each set of shaped lens is made up of a plurality of lens which can be thought of as having been cut from the central region of a round convex or double convex lens so that its marginal shape is proportional to the shape of the area (such, for example, as a film gate opening) to which the light is to be projected. A plurality of such lenses are arranged in an array side by side in a plane to receive light from the collimating lens. A second similar array of shaped lens is positioned proximately to the first array. The collimating lens makes the source look like it is an infinite distance from the first array. Each lens of the first array directs an image of the source, shaped with the desired end shape, to the second array where those images are directed individually to the focusing lens.

The focusing lens receives all of the images from the second array and directs them toward a common image plane, such, for example, as the plane of a film gate.

It is a feature of the invention to include a transfer lens system in the light path between the integrating lens system and the image plane to alter (reduce) the area of the beam so that it has the desired size at the image plane or film gate, and to make the beam converge to a projection lens system where the beam is projected to infinity.

These and other objects and advantages and features of the invention will be made apparent in the description of a preferred form of the invention that follows.

BRIEF DESCRIPTION OF THE DRAWINGS

In the drawings:

FIG. 1 is a diagram of a light projection system which incorporates the features of the invention in the mode now considered to be best;

FIG. 2 is a diagram illustrating the operation of conventional reflectors;

FIG. 3 is a diagram of the integrating lens system of FIG. 1;

FIGS. 4 and 5 are diagrams showing how the lens of the integrating system may be formed; and FIG. 6 is a view taken on line 6—6 of FIG. 3 of the front of an integrating system lens array.

DESCRIPTION OF THE PREFERRED EMBODIMENT

In FIG. 1 the light directing system 10 is shown in a picture projection system. Light from a conventional lamp 12 is reflected by a reflector 14. The reflected radiations pass through an annular lens 16. Part of those radiations pass through the aperture of an annular cold mirror 18. The remainder of the radiations are reflected by mirror 18 to a mirrored lens 20 where they are again reflected and pass through the aperture of mirror 18. All of the radiations are reflected by flat cold mirror 22 and are directed substantially perpendicular to the reflector axis to an integrating lens system 24. After passing through the integrating system, the light passes through a transfer lens system 26 and a film gate 28 to a projection lens system 30.

While the lamp cage and holder form no part of this invention, and have been omitted for the sake of clarity, it will be apparent that central opening 32 of the reflector and the central opening 34 of the annular lens 16 permit mounting of the lamp in a cylindrical safety cage for insertion and removal with a safe lamp holder.

The reflector 14 of the preferred embodiment is special as a comparison with FIG. 2 will show. FIG. 2 is a diagram of parabolic and elliptical reflector shape operation. The reflector portion 40 above centerline 42 has parabolic shape. Reflections are directed along lines parallel to the reflector axis. Reflector portion 44 has elliptical shape. While the figures are not drawn to accurate scale, the reflected light in the case of reflector 14 is focused at a point 36 which is about the same distance from the light source 38 in lamp 12 as the focal point of reflector 44 is from light source 46 in FIG. 2. Examination of FIG. 2 will show that the elliptical, focusing reflector has smaller diameter than does the parabolic reflector. Comparison of FIGS. 1 and the lower portion of FIG. 2 will show that the reflector of the invention has much smaller diameter for a given amount of reflection capability than either of the FIG. 2 reflectors.

The shape of the reflector 14 of FIG. 1 and the shape of the lens 16 are interrelated so that the light output from the combination is focused to the same point notwithstanding that different regions of the reflector, in the direction of the open end, reflect light to successively closer focal points. That characteristic of the reflector can be verified by comparison of the several light rays that have been drawn in FIG. 1. Rays 50 and 51 are reflected by surfaces near the center of the reflector in a direction parallel to the reflector axis. That suggests, and it is correct, that in this embodiment the inner end region of the reflector is parabolic. Rays 52 and 53 are reflected from the mid-region along the length of the reflector and are directed toward focal point 36. Rays 54 and 55 are reflected from the outer margins of the reflector 14 and it is apparent that they are directed to a focal point much closer to light source region 38 than is focal point 36. Thus, in this embodiment, the reflector is shaped like one end of a modified ellipse whose remote focal point recedes to inifinity as one proceeds along the reflective surface toward the pole end.

By that expedient, the reflector diameter is reduced. The reflected rays are directed to a common focal point by a lens shaped to redirect those rays that are not reflected toward the desired single focal point. In this embodiment, the lens 16 serves that purpose. The rays 52 and 53 pass through an annular region of the lens where magnification is zero. Those rays are directed by the reflector toward the focal point 36 and they require no redirection. Rays 50 and 51 are directed to infinity. They must be redirected to shorter focal length, to point 33, so the annular region of lens 16 through which they pass is shaped tp provide positive power.

Rays 54 and 55 and rays 56 and 57 are directed between rays 54 and 52 and rays 55 and 53, respectively. They are directed to points closer than point 36 to the light source. Therefore, the lens 16 is shaped to magnify outer rays 54 and 55 more than inner rays 56 and 57. Thus it is that the lens 16 is shaped to provide power that varies from a positive value near the center to zero at a mid-region to a negative value at its outer margins.

The several rays in FIG. 2 are drawn leaving source 46 with equal angles between them. The spacing of the points at which successive rays strike the reflector increases toward the outer margins of the reflector. It is clear that the intensity of the light across the output beam is much less at the outer regions than at more central regions. It is a feature of the invention to increase the uniformity across the beam not by directing light from the central region to marginal regions, but by interrupting the light at the outer margins of the beam and adding that light to the central region.

That is accomplished in this preferred embodiment by placing the annular mirror 18, its axis substantially coincident with the axis of the reflector, in the path of the light that is reflected by the outer marginal part of reflector 14. The light is reflected to a lens 20 whose rear surface is mirrored and which reflects and directs the light to converge toward focal point 36. The design of the lens 20, the other portions of lens 16, and the size and placement of lens 16 and mirror 18 are coordinated using conventional design techniques.

The output of the system thus far described is a circular beam in which intensity is relatively uniform across the beam. Any further optical elements may be placed on the axis of the reflector 14 or, as in this preferred embodiment, the beam may be redirected. Mirror 22 is flat and, like mirror 18, is coated to be reflective of visible light and to pass infra-red radiations. Thus, the mirrors are arranged to separate away the heat from the visible light. The visible light is redirected on an axis perpendicular to the axis of the reflector.

The system thus far described makes a superior light directing system for some purposes, but the preferred system for use in motion picture projection includes a means for dividing the light that passes through the aperture of mirror 18 into a plurality of beams each having a cross-sectional shape proportional to the shape of the film gate (or other area to be illuminated). The plurality of beams is then recombined into a single beam having a cross-sectional shape proportional to the film gate shape. The single beam is formed by the superimposition of the plurality of beams. The division and superimposition is accomplished in the anamorphic integrating lens system 24 which is shown enlarged in FIGS. 3 and 6.

In FIG. 3, the system 24 is shown to comprise a collimating lens 60, a first array 62 of shaped lenses, a second array 64 of similarly shaped lenses, and a focusing lens 66. The first lens of the integrating system collimates light from mirror 22 so that the aperture in mirror 18 appears to the array 62 to be at infinity. The array is shown in FIG. 6 to be formed of twelve individual lenses all rectangular in shape and arranged side by side in a three by four grid. The rectangular shape of the individual lenses of the array corresponds to the shape of the film gate 28 to be illuminated. Designed for projection to wide screens, the gate, and so the mirror segments of the array, are two units high and three units wide. One segment of the array is designated 68, and FIGS. 4 and 5 illustrate its shape by showing how it can be cut from a round, double convex lens 70 shown in dashed lines. All of the segments of the array 62 have the same shape. Moreover, in this case, the segments of array 64 are shaped like segment 68. The arrays are alike in that they have equal numbers of segments, similarly arranged and oriented such that each segment in array 62 is opposite a counterpart segment in array 64. Thus, the light output from segment 68 of array 62 is directed to segment 72 of array 64. Segments 68 and 72 form a pair which project an image, rectangular in shape, of the light source on the film gate opening. So does every other pair of lens segments whereby the image formed at the film gate is the sum of twelve superimposed images of the light source. The twelve images are taken from the different areas of the beam entering the integrating system.

That this arrangement results in uniform intensity across the gate can be understood by examining what happens to the light passing through two pairs of segments, one pair at the top and the other at the bottom of the array. Assume that segment 76 is part of the top pair and that segment 78 is part of the bottom pair (see FIG. 6). Light passing through the upper part of segment 76, nearer the outer margin of lens 60, reaches the upper edge of the film gate opening. Light passing through the corresponding upper part of segment 78, which is nearer the center of lens 60, also reaches the upper edge of the film gate opening. Thus, the light reaching the upper edge of the film gate opening is an average of the light which reaches an edge region and the light which reaches a central region of the collimating lens 60. A similar examination of the light reaching the lower edge of film gate through segments 76 and 78 and of the light that reaches the film gate through other oppositely placed sets of segment pairs will show that an uneven light distribution entering the array is overcome in the overlapping process.

Focusing lens 66 focuses the output of each segment of array 64 and projects the composite image at the plane of gate 28. The beam diverges toward the gate. A transfer lens set 26 reduces the magnification so that the beam is only slightly larger than the gate opening at the gate plane. In addition, the transfer lens set 26 directs the image of the light source to the projection lens system 30. System 30 may be any conventional projection system designed to project the image to infinity.

Although I have shown and described certain specific embodiments of my invention, I am fully aware that many modifications thereof are possible. My invention, therefore, is not to be restricted except insofar as is necessitated by the prior art.

I claim:

1. In combination:
   a lens exhibiting a given value of amplification at one region and a given greater value of amplification at a second region and exhibiting amplification variable from said given value to said greater given value in successively arranged regions between said one region and said second region;
   a light source;
   a reflector positioned to receive light from said source and being curved to direct said light from the several regions of the reflector through the several regions of the lens to a common focal point; and
   further comprising a first mirror and a second mirror, the first positioned to reflect light from some of the several regions of the lens to the second mirror, and the second positioned to reflect rays from the first in the direction of said common focal point.

2. The invention defined in claim 1 which further comprises a second lens positioned to direct rays from said second mirror to intersect at said common focal point.

3. In combination:
   a lens exhibiting a given value of amplification at one region and a given greater value of amplification at a second region and exhibiting amplification variable from said given value to said greater given value in successively arranged regions between said one region and said second region;
   a light source;
   a reflector positioned to receive light from said source and being curved to direct said light through the several regions of the lens to a common focal point; and
   further comprising a first mirror and a second mirror, the first positioned to reflect light from some of the several regions of the lens to the second mirror, and the second positioned to reflect rays from the first in the direction of said common focal point;
   a second lens positioned to direct rays from said second mirror to intersect at said common focal point; and
   said reflector and first mentioned lens and said first mirror being symmetrical about a common axis, said first mirror comprising an annulus of a size to intercept and reflect reflections from the outer annular region of said reflector.

4. The invention defined in claim 3 which includes an amorphic integrating lens system arranged to receive light from said mirrors and comprising:
   first and second lens arrays the lens elements of each arranged side by side in a plane and the arrays disposed in spaced parallel planes with their elements in juxtaposition;
   each element having shape corresponding to that of a circular lens of given optical characteristic having its margins cut away to form the required outline shape in the plane perpendicular to its optical axis 5. The invention defined in claim 4 which further comprises a focusing lens positioned at the side of the second array opposite the first array and effective to focus light received from each of the elements of said one array at an image plane on an area corresponding in shape to said outline shape of the elements.

6. The invention defined in claim 5 which further comprises a transfer lens system positioned between said focusing lens and said image plane and effective to cause light from the focusing lens to be changed in magnitude such that it covers an area at said image plane which has a predetermined ratio to the area within the outline shape of each of said elements of said second array.

7. The invention defined in claim 5 which further comprises a collimating lens positioned at the side of said first array away from said second array.

* * * * *